United States Patent Office 3,329,390
Patented July 4, 1967

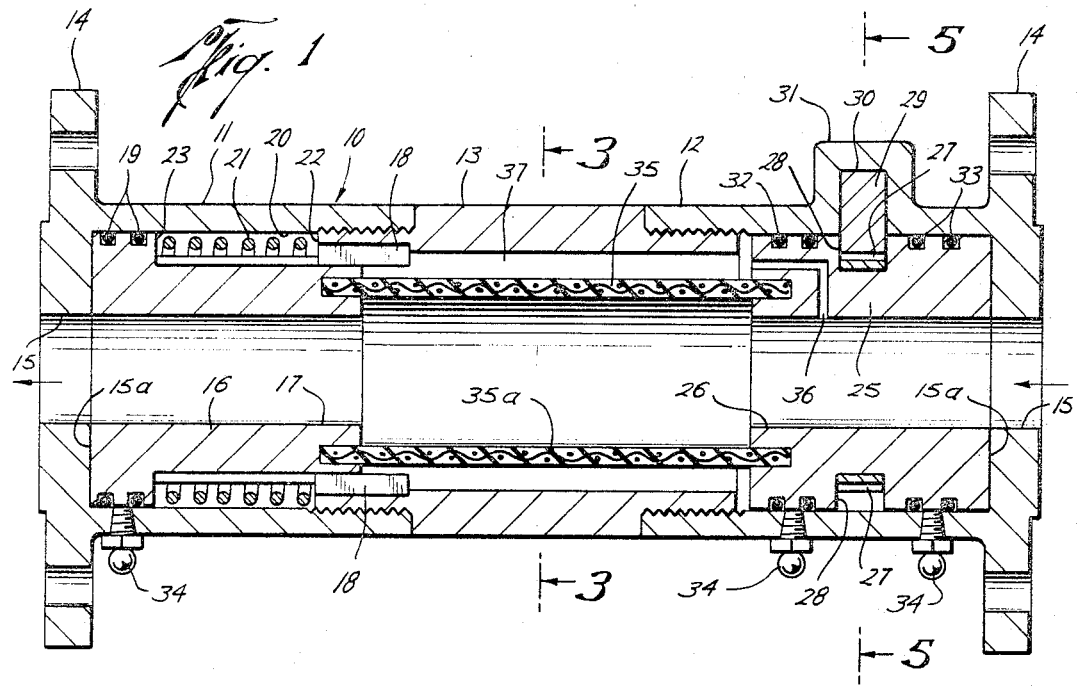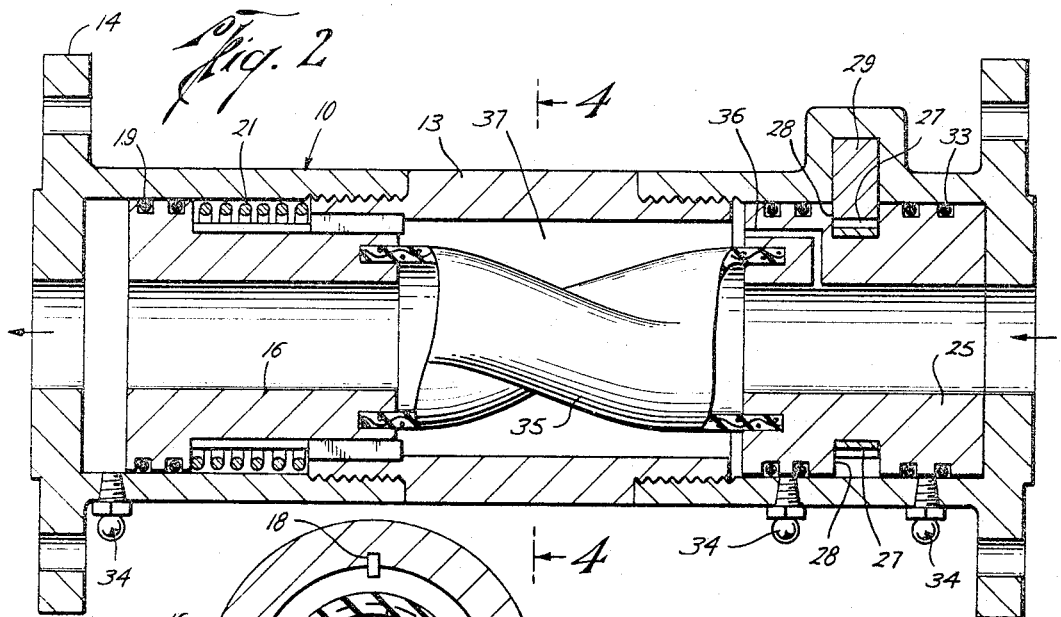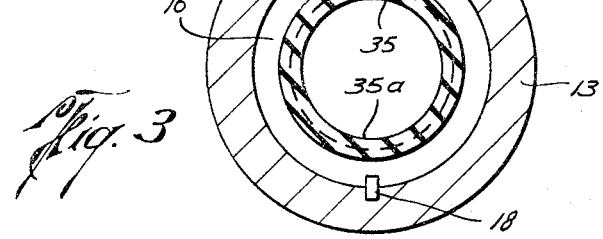
Eldon E. Hulsey
INVENTOR.
BY
ATTORNEY

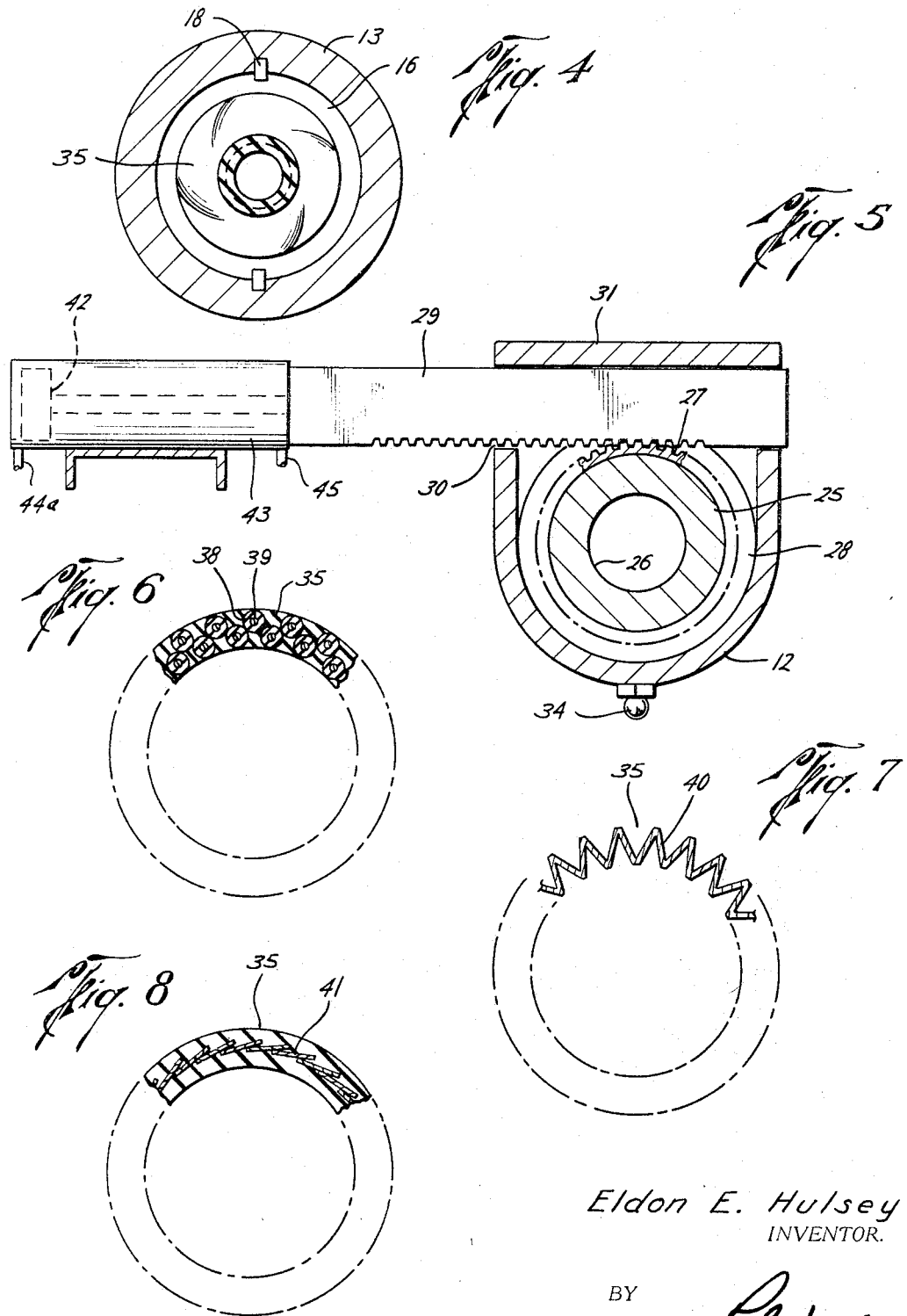

3,329,390
VARIABLE ORIFICE VALVE
Eldon E. Hulsey, 5747 Warm Springs,
Houston, Tex. 77035
Filed Feb. 18, 1965, Ser. No. 433,673
8 Claims. (Cl. 251—4)

This invention relates to flow control valves and more particularly to variable orifice valves for regulating the rate of flow of fluids, especially gas.

In many industrial installations employing gas for fuel, for processing, or for other purposes, it is often necessary to vary the supply of gas from a large volume, high pressure supply main to various lower volume, lower pressure distribution lines, the distribution usually being effected through a manifold having a plurality of branches, each with its individual control device. In such installations, as for example, in the steam boiler plants of electric power generating stations, the volume of fuel gas required will vary with the load demand. This requires frequent and varying changes in the fuel valve settings which have proven most troublesome in most installations because the usual types of gate valves or other more conventional types of regulating valves are subject to severe erosion and wear of the seats and closure elements when the valves are pinched-down from their fully open position, producing high pressure drops and velocity increases. Although in an ideal installation it should not be necessary to completely shut off any header valves, but merely vary the orifice in each valve as the demand varies, in practice, because of the severe erosion on the valve parts when the flow passage is restricted, it has been necessary usually to shut-off some of the valves completely while others are kept fully open. Thus in a multi-boiler or gas engine installation, it may be necessary for some of the boiler or engine units to be alternately and repeatedly shut down completely and re-opened to accord with the load demands. Otherwise, as noted, the damage to the control valves is so severe and rapid that repair and replacement is a frequent and almost continuous problem. Also, pinching down of the valves produces a high degree of turbulence in the gas flow which is undesirable and, in the presence of water vapor in the gas, enhances the formation of hydrates with resultant plugging of the valve orifices.

The present invention has for its primary object the provision of an improved form of variable orifice valve which will obviate the difficulties, such as enumerated above, presently encountered in systems employing valves required for effecting frequent and varying changes in fluid flow therethrough.

The valve construction in accordance with this invention embodies the use of an orifice sleeve or throat member of flexible construction which by twisting one end with respect to the other, will correspondingly vary the cross-sectional dimensions of the opening therethrough. While regulating or control valves employing this general principle of construction are known, the principal objects of the present invention are to provide improved forms of such valves which are of exceptionally simple and rugged construction; which will withstand frequent and varying changes in orifice area between fully open and substantially fully closed conditions with a minimum of wear or damage.

While valves in accordance with this invention may be designed to effect a complete closure, the present invention is directed more particularly to valves which will usually not need to be closed-off entirely but which may require operation over a wide range of orifice areas.

Another important object of this invention is to provide an orifice sleeve or throat member constructed of a rubber or rubber-like composition adapted to be readily expanded and constricted as required while withstanding the erosive action of high velocity fluid flow therethrough.

A further object is the provision of a valve of the class described which includes means for balancing the up-stream pressures inside and outside the throat member to obviate collapse thereof during use.

Still another object is the provision of a form of actuating means for effecting the twisting movement of the throat member, which is simple in construction and is pressure-balanced so as to require a minimum amount of force for operating the valve.

Other and more specific objects and advantages of this invention will become more readily apparent from the following description when read in conjunction with the accompanying drawing which illustrates a useful embodiment of the invention and several modifications thereof.

In the drawing:

FIG. 1 is a longitudinal sectional view of one form of valve in accordance with this invention, showing the parts in the fully open condition of the valve;

FIG. 2 is a view similar to FIG. 1, showing the positions of the parts in the partly closed condition of the valve;

FIG. 3 is a cross-sectional view taken along line 3—3 of FIG. 1;

FIG. 4 is a cross-sectional view taken along line 4—4 of FIG. 2;

FIG. 5 is a cross-sectional view taken along line 5—5 of FIG. 1; and

FIGS. 6, 7 and 8 are cross-sectional views similar to FIG. 3 but illustrating several modified constructions of the orifice sleeve or throat member of the valve.

The valve in accordance with one embodiment of this invention comprises a tubular body, designated generally by the numeral 10, constructed of coaxially disposed end sections 11 and 12 and an intermediate body section 13 threadedly secured between the end sections. The latter are provided with suitable connecting means, such as bolt flanges 14—14, for connecting the valve into a pipe line. The flanges have axial openings 15—15 therethrough forming the flow ports for the valve and defining inwardly facing annular shoulders 15a—15a at the opposite ends of body 10. Mounted in end section 11 is a sliding collar 16 having an axial bore 17 coaxial with passages 15. Collar 16 is slidably secured to body section 11 by means of longitudinal splines 18 arranged to permit non-rotative longitudinal movement of collar 16 relative to body 10. Suitable seal packings, such as O-ring seals 19, are disposed to form fluid-tight, slidable seals between the outer end portion of collar 16 and the bore wall of body section 11. A portion of the exterior of collar 16, spaced from its outer end, is reduced in diameter to form an annular spring chamber 20 between collar 16 and the wall of body section 11. A coil spring 21 is mounted in chamber 20 surrounding the reduced diameter portion of collar 16, the spring being disposed in compression between the interior end face 22 of body section 13 and a shoulder 23 on collar 16 defined by the reduction in diameter which forms chamber 20. Spring 21, therefore, tends to resiliently bias collar 16 in the left-hand or outward direction, the outward movement of the collar being limited by engagement with shoulder 15a.

Mounted in the bore of body section 12 is a cylindrical actuating collar 25 having an axial bore 26 coaxial with openings 15 and with bore 17 of collar 16, forming therewith and with openings 15 the flow passage through the valve body. Actuating collar 25 is disposed for rotation in the bore of section 12 and carries a pinion or ring gear 27 extending circumferentially about the exterior thereof and located in an annular recess 28 provided in the exterior surface of the actuating collar intermediate the ends thereof. A rack 29 is disposed to mesh with pinion 27 and extends through a suitably shaped opening 30 provided in a suitably shaped opening 31 formed on a side of body section 12. Reciprocable movement of rack 29, generally tangentially of body 10 in engagement with pinion 27, will operate to reversibly rotate actuating collar 25, which will be held against longitudinal movement by engagement of rack 29 with the walls of recess 28. Collar 25 is provided with pairs of O-ring seals 32—32 and 33—33 between the exterior thereof and the interior wall of body section 12, the seals being located on opposite sides of recess 28 in order to seal off the actuating mechanism from the interior of the valve body.

An orifice sleeve or throat member 35 having a bore 35a is disposed coaxially of body 10 within the bore of section 13 and has its opposite ends anchored and sealed in any suitable manner in the facing ends of sliding collar 16 and actuating collar 25. A pressure equalizing passageway 36 communicates bore 26 of the actuating collar with the sealed annular space 37 defined between the exterior of orifice sleeve 35 and the inner wall of body 10 and sealed off at its opposite ends by seals 19 and 32. Orifice sleeve 35 may be made of a suitable flexibly deformable material, such that when one end is twisted about its longitudinal axis with respect to the other end, the throat or bore thereof will change in cross-sectional area in proportion to the extent of the twisting movement. Orifice sleeve 35 may, therefore, be made of a resilient material, such as a natural or synthetic rubber, or other elastomeric plastic material having the desired characteristics, and will preferably be constructed to include re-inforcing elements of various types embedded in the plastic material from which the sleeve is constructed. The ends of the sleeve may be anchored to the facing ends of sliding collar 16 and actuating collar 25 in any well-known and suitable manner to be effectively secured thereto and to seal with the collar members to which it is attached.

The construction of sleeve 35 may vary widely, it being important only that twisting action to vary the orifice therethrough may be carried out with a minimum of difficulty.

FIGS. 6, 7 and 8 illustrate various modifications of the orifice sleeve. In FIG. 6, sleeve 35 is constructed of an elastomeric body which is molded about a plurality of parallel, longitudinally extending cord-like elements each comprising an elastomeric casing 38 and a flexible metallic core 39. The cord-like elements are preferably arranged in a series of rows in which the elements in one row are staggered with respect to those in the next adjacent row. Other arrangements may also be used.

In the modification shown in FIG. 7, a metallic bellows-type annular body 40 is embedded by molding or vulcanization in the body of plastic material comprising sleeve 35. The convolutions of the bellows, which extend longitudinally of the sleeve, will be compressed and expanded in response to the twisting action applied to the sleeve.

In the modification illustrated in FIG. 8, a plurality of over-lapping thin metal strips 41 are molded into the body of sleeve 35, the arrangement being such that as sleeve 35 is twisted, plates 41 will ride over one another forming a smaller or larger diameter ring in accordance with the degree of twisting which may be applied to the sleeve.

In still other modifications, the orifice sleeve may be constructed entirely of longitudinally arranged strips of thin metal, arranged like plates 41 in FIG. 8, wherein the longitudinal edges of the plates over-lap so as to slide over one another in response to the twisting action. While some leakage may occur between the strips, this is of little significance in connection with the major variable orifice function of the device.

Rack 29 may be operated manually or mechanically by any suitable form of operator which may be arranged to reciprocate the rack, as required, for twisting the orifice sleeve in order to vary the orifice through the valve. As shown in FIG. 5, the operator may be a fluid pressure actuated device consisting of a piston 42 disposed in a cylinder 43 secured to a suitable support 44. Piston 42 will be suitably connected to rack 29 for reciprocating the latter in response to fluid pressure supplied to cylinder 43 through conduits 44a and 45, all in a generally well-known manner. It will be understood that electrical motor-driven or other electrically operated known forms of valve operators may be employed for actuating rack 29.

In operating the valve, fluid flow being assumed to be in the direction indicated by the arrows in FIGS. 1 and 2, when it is desired to reduce fluid flow through the valve, rack 29 will be operated to rotate actuating collar 25 in a direction and to an extent necessary to twist the upstream end of sleeve 35 to change the cross-sectional area of bore 35a of the orifice sleeve by an amount sufficient to restrict the flow of fluid through the valve to the desired degree. By providing pressure equalizing passageway 36, it will be seen that the upstream pressure will be balanced across sleeve 35, thereby preventing collapse of the orifice sleeve due to pressure drops resulting from the restriction effected by the twisting of the sleeve. By means of this arrangement, it will be seen that the orifice area may be varied through an extremely wide range from a fully opened to a substantially closed position, although the latter position will rarely be attained since the valve is not intended to be employed as a shut-off valve but only as a flow restricting device.

As the valve sleeve is twisted, fore-shortening thereof will necessarily occur and this will be accommodated by the corresponding longitudinal movement of sliding collar 16 in opposition to the pressure of spring 21. When reverse rotation of actuating collar 25 occurs to enlarge the area of throat 35a, spring 21 will correspondingly urge collar 16 in the downstream direction to take up the resultant lengthening of sleeve 35. With this arrangement, sleeve 35 will be maintained under tension at all times, thereby protecting it against wrinkling or collapse at any operation position and thus maintaining a smooth configuration of the throat area offering minimum resistance to fluid flow therethrough.

The employment of an orifice sleeve of the form and construction illustrated and described will provide generally non-turbulent flow under substantially all conditions of operation, so that vibration, noise and other undesirable conditions will be greatly obviated.

Moreover, by using resilient plastic material for orifice sleeve 35, the latter will be strongly resistant to chemical corrosion or abrasion or erosion and like conditions to which metallic valves are normally subject. In the case of the modification employing over-lapping strips, of thin metal, the latter may be made of highly resistant metals, such as titanium or other hard but flexible metals. Such metallic constructions will ordinarily be employed where high temperature fluids are being controlled.

By providing seals 32 and 33 on opposite sides of recess 28, the operating mechanism for the valve will be protected from the pressures existing interiorly of the valve. As a result the force required to operate the valve actuator will be only that necessary to overcome the friction between the several moving parts and resistance to twist of sleeve 35. Hence, variation of the valve orifice may be effected with a minimum of effort or power requirement. The seals 19, 32 and 33 may be lubricated by lubricant supplied through appropriately located supply fittings 34 to reduce the friction and protect the O-ring seals.

It will be understood that numerous other modifications and changes may be made in the illustrative embodiments within the scope of the appended claims but without departing from the spirit of the invention.

What I claim and desire to secure by Letters Patent is:

1. A variable orifice valve, comprising, a tubular body having an axial bore defining a flow passage therethrough, first and second collar members coaxially disposed in longitudinally spaced relation in said bore, said first collar member being arranged for longitudinal movement and said second collar member for rotary movement in said bore, a flexibly deformable sleeve member coaxially disposed in said bore and having its ends fixedly secured to the respective collar members, drive means for rotating said second collar member relative to the first collar member whereby to twist one end of said sleeve member relative to the other and thereby to proportionally change the cross-sectional area of the bore of said sleeve member, means resiliently biasing said first collar member longitudinally away from said second collar member whereby to maintain tension on said sleeve member, means sealing between the respective collar members and the surrounding wall of said body and defining a sealed annular space surrounding said sleeve member, and a pressure-equalizing passage communicating the upstream end of said flow passage with said annular space.

2. A variable orifice valve according to claim 1, wherein said sleeve member is constructed of an elastomeric material having metallic reinforcing elements annularly arranged and embedded therein.

3. A variable orifice valve according to claim 1, wherein said drive means comprises rack-and-pinion members, the pinion member comprising an annular gear mounted about the exterior of said second collar member, and said rack member extending through the wall of said body generally tangentially thereto and in mesh with said pinion member.

4. A variable orifice valve according to claim 3 having annular seals disposed about said second collar member sealing with the surrounding body at longitudinally spaced points on opposite sides of the opening through which said rack member extends.

5. A variable orifice valve according to claim 1, wherein said means resiliently biasing said first collar member comprises a coil spring surrounding said first collar member and disposed in compression between said first collar member and said body.

6. A variable orifice valve according to claim 1, wherein said sleeve member is constructed of a tubular elastomeric body having molded in the wall thereof a plurality of flexible reinforcing cords arranged in parallel and extending longitudinally of the body, each of said cords comprising a generally cylindrical elastomeric casing and a metallic core disposed axially thereof.

7. A variable orifice valve according to claim 1, wherein said sleeve member is constructed of tubular elastic body having molded in the wall thereof an annular metallic bellows-type reinforcing element having its convolutions disposed longitudinally of said sleeve member.

8. A variable orifice valve according to claim 1, wherein said sleeve member is constructed of a tubular elastomeric body having molded in the wall thereof a plurality of thin metal strips extending longitudinally of the body and having their longitudinal edges in over-lapping relation arranged to form a contractible-expandible ring in response to the twisting of said sleeve member.

References Cited
UNITED STATES PATENTS

| | | | |
|---|---|---|---|
| 977,044 | 11/1910 | Rebourg | 138—45 X |
| 3,032,812 | 5/1962 | Van Riper | 251—9 X |

FOREIGN PATENTS

| | | |
|---|---|---|
| 575,950 | 5/1959 | Canada. |
| 1,221,730 | 1/1960 | France. |

WILLIAM F. O'DEA, *Primary Examiner.*

R. GERARD, *Assistant Examiner.*